N. B. CONVERSE.
FILLING, WEIGHING, AND PACKING APPARATUS.
APPLICATION FILED MAY 19, 1906. RENEWED NOV. 6, 1911.

1,029,669.

Patented June 18, 1912.

WITNESSES:
J. E. Grant
T. J. Bennett

INVENTOR.
N. B. Converse
BY
F. M. Wright,
ATTORNEY.

N. B. CONVERSE.
FILLING, WEIGHING, AND PACKING APPARATUS.
APPLICATION FILED MAY 19, 1906. RENEWED NOV. 6, 1911.

1,029,669.
Patented June 18, 1912.
7 SHEETS—SHEET 4.

WITNESSES:

INVENTOR.
BY
ATTORNEY.

N. B. CONVERSE.
FILLING, WEIGHING, AND PACKING APPARATUS.
APPLICATION FILED MAY 19, 1906. RENEWED NOV. 6, 1911.

1,029,669.

Patented June 18, 1912.

WITNESSES:
J. E. Goant
F. J. Bennett

INVENTOR.
N. B. Converse
BY
F. M. Wright
ATTORNEY.

N. B. CONVERSE.
FILLING, WEIGHING, AND PACKING APPARATUS.
APPLICATION FILED MAY 19, 1906. RENEWED NOV. 6, 1911.

1,029,669.

Patented June 18, 1912.

UNITED STATES PATENT OFFICE.

NEWTON B. CONVERSE, OF FRESNO, CALIFORNIA, ASSIGNOR TO NEWTON B. CONVERSE, J. E. DICKINSON, FRANCIS M. WRIGHT, B. W. NEWTON, L. Z. ICKES, AND K. ARAKELIAN, TRUSTEES.

FILLING, WEIGHING, AND PACKING APPARATUS.

1,029,669. Specification of Letters Patent. Patented June 18, 1912.

Application filed May 19, 1906, Serial No. 317,842. Renewed November 6, 1911. Serial No. 658,879.

*To all whom it may concern:*

Be it known that I, NEWTON B. CONVERSE, a citizen of the United States, residing at Fresno, in the county of Fresno and State of California, have invented certain new and useful Improvements in Filling, Weighing, and Packing Apparatus, of which the following is a specification.

The object of the present invention is to provide an apparatus for packing in cartons or other suitable receptacles measured quantities of material, as fruit, and especially seeded raisins, which shall be rapid in operation, and as automatic as possible, to reduce the amount of supervision required.

In the accompanying drawing, Fig. 22 is a broken side view of the chutes.

Referring to the drawings, 1 indicates a frame or table supporting the machine, comprising the side castings 2, connected by cross pieces 3. On the forward side of the cross piece 3 at the delivery end of the machine is secured a bracket 4 carrying a bearing 5 for a stud shaft 6, upon which is mounted a driving pulley 7, driven from any suitable source of power. On the rear side of said cross piece 3 is secured a bracket 8 carrying a bearing 9 for the main shaft 10, which carries a worm 11 which meshes with a worm gear 12 upon a sleeve 13 mounted upon a stationary shaft 14 extending between the side members 2, which sleeve also carries a gear 15 meshing with an intermediate gear 16 upon a stud shaft 17, said latter gear meshing with a gear 18 upon a sleeve 19 on a transverse stationary shaft 20 secured between said side members, said sleeve carrying three cam wheels, 21, 22, 23, by which the several operations of the machine are executed at the proper times.

Before describing these operations, it may be stated that the movement of the machine is intermittent in character, and is also automatically controlled by the feed of the raisins or other material to be packed, so that the length of time during which the machine is completely at rest depends inversely upon the accuracy with which the velocity of said feed is regulated to correspond with the speed at which the machine disposes of the cartons after they are filled. If the feed be so timed as, on the one hand, to keep pace with the disposition of the cartons, and, on the other hand, not to over feed, then there will be practically no period of rest of the machine.

The shaft 10 carries, on its end next the stud shaft 6, a hub 24 having a cast iron disk 25, said hub being slidably connected to said main shaft, but imparting revolution thereto when the disk itself is revolved. The driving pulley 7 is made an electro-magnet by means of a coil of wire 26 in a circular recess 27, the ends of which coil are passed through the pulley, and are connected to collector rings 28 on the rear side of the pulley, which rings revolve against brushes 29, connected with wires 30, 31, in an electric circuit. The character of this circuit will be described hereinafter; at present it may be stated that, when the circuit is turned on, said pulley becomes an electro-magnet and attracts the disk 25. However, a thin sheet 32 of copper is secured on to the cast iron pulley, and between said pulley and disk, and acts as a diamagnetic shield to break the magnetic circuit between the pulley and cast iron disk when the current is turned off, thus preventing the residual magnetism left in the pulley from having any appreciable effect upon the cast iron disk 25, although the sheet is not sufficiently insulatory to prevent the attraction of the disk by the magnet when the current is turned on; thus, immediately the current is cut off, the electro-magnetic pulley 7 ceases to act on the disk.

In order to rapidly bring the shaft 10 to rest when the current is turned off, the disk 25, then being no longer attracted by the pulley 7, is pressed against stationary shoes 33 secured on a brake piece 34, this pressure being applied by a compressed coiled spring 35 in a central recess 36 of the shaft 6, said spring surrounding a stud 37 and pressing against the flanged head 38 of said stud, the center of which head is recessed and contains a hardened ball 39, which presses against the hardened central portion 40 of the disk 25. When the current is on, the magnetic attraction overcomes the pressure of this spring 35, and draws the back of the disk 25 away from the brake shoes 33, but when the current is turned off, the spring 35, acting through the ball 39, presses the disk against the brake shoes. 55 indicates a collar with a sharp edge to throw off the oil by centrifugal force.

Upon the frame is secured a channel or guideway 41 for the cartons 42, having side walls 43 which are recessed for the greater part of their height to reduce the friction caused by advancing the cartons in the channel, and also to assist in maintaining the carton upright.

In the channel are two main openings, the first for the filling and weighing mechanism, and the second for the compressing mechanism, both hereinafter described. Between the two openings, the channel is open to permit waste matter to drop through, except for a central longitudinal narrow bridge 44 for supporting the cartons. A similar bridge 45 extends from the opening for the compressing mechanism to the part of the channel where the carton is closed and buttoned.

The cartons are fed to the machine, already formed, and into each carton is inserted a metal funnel 46 which, extracted by the machine from a carton already filled, as hereinafter described, has been by it delivered to a place convenient for an operator to re-insert the funnel into an empty carton. The funnel has formed, at one side, a bulge 58 to slide against the wall of the channel. The carton, with the funnel therein, is then placed upon a guideway 47, the funnel itself being engaged by its bead 126 between a pair of endless chains 49 driven by a belt 50 from any suitable source of power, the chains thus supporting the heavy funnel, while the light carton slides upon the top of the guideway. The cartons, with the funnels therein, are thus advanced by the traveling chains, the foremost carton and funnel automatically taking the place of any funnel and carton which has been advanced in the channel 41 in the operation of the machine. By this means the feed channel 41 is kept supplied with cartons having funnels therein. These cartons are then advanced in line toward the weighing mechanism by the following means:—Extending on one side of the channel or guideway is a tube or hollow shaft 51, the ends of which receive, and are supported by, shafts 52, 53, extending horizontally and longitudinally from standards 54 mounted upon the table of the machine. This tube can therefore slide longitudinally upon these shafts; it also rocks with the forward shaft 52 and on the rear shaft 53. The sliding and rocking motions are both necessary for advancing the cartons. The tube has secured thereon, by set screws 56, hook-shaped pushers 57 in alinement with each other and spaced at a proper uniform distance, so that the pushers both rock and move longitudinally with the tube, and by means of the tube are each given the following motion. From the rear position, in which a pusher rests behind a carton, it is moved forward a sufficient distance to move said carton with it into the place of the carton preceding it; it is then moved slightly backward so as to move out of contact with the carton that has been advanced; it is then rocked upward so as to be clear of the carton; it is then returned to a position opposite the space between the succeeding two cartons; and it is then rocked downward so as to drop behind the next carton succeeding that which has been just pushed forward by said pusher. Thus, in each complete cycle of its movement, the pusher advances the carton through the space between successive cartons, and all the pushers have the above motion simultaneously.

Figures 1, 2:
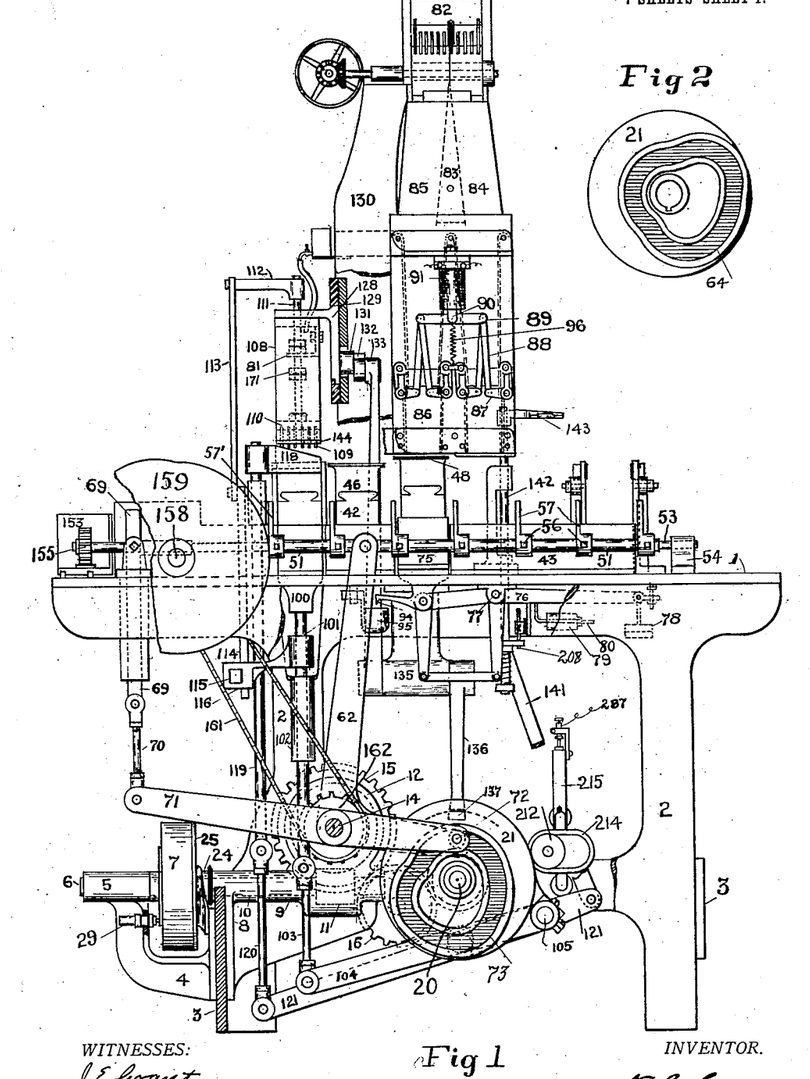
Figure 1 is a side elevation of the machine, broken away in parts.
Fig. 2 is a rear view of one of the cams.
Figure 3:
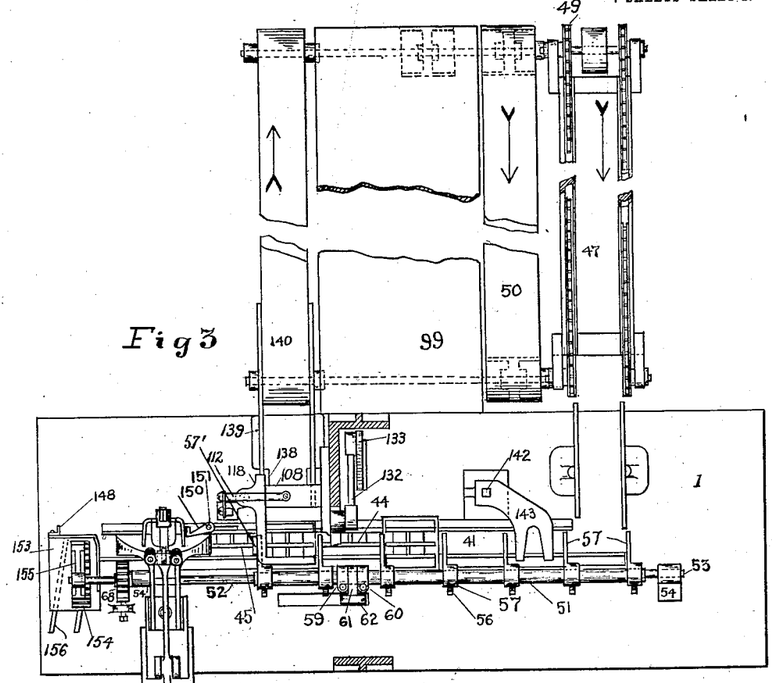
Fig. 3 is a plan view of the machine.
Figure 4:
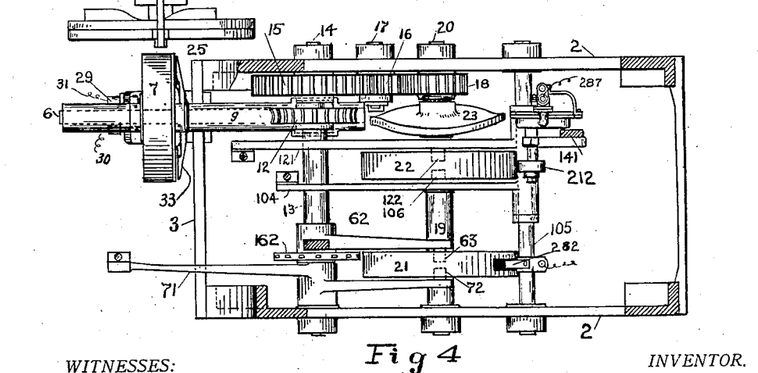
Fig. 4 is a horizontal section thereof below the table.
Figures 5, 6, 7:
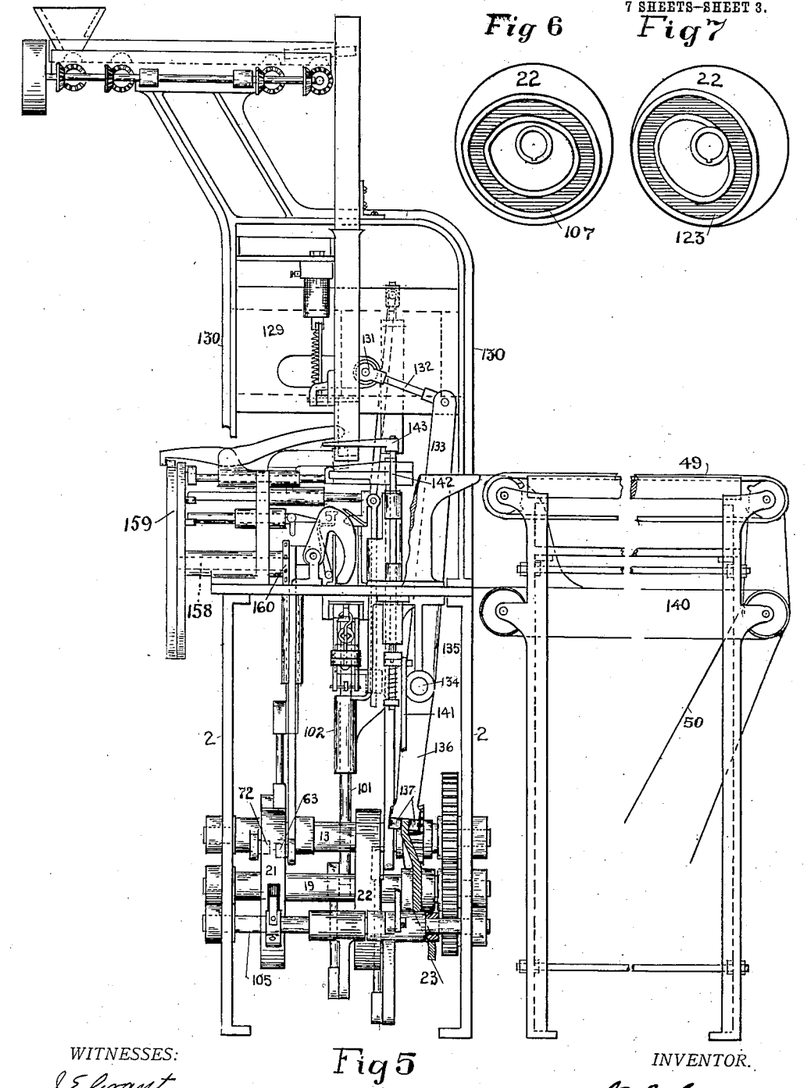
Fig. 5 is an end view of the machine.
Figs. 6 and 7 are views from opposite sides of another cam wheel.
Figure 8:
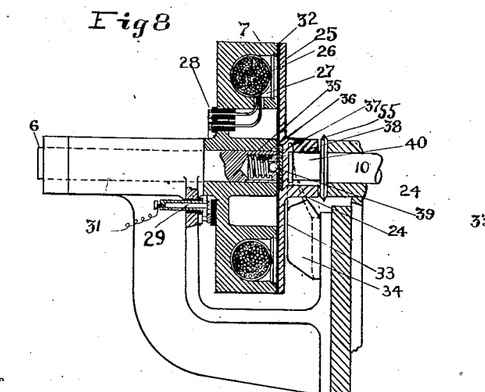
Fig. 8 is a longitudinal sectional view of the electro-magnetic clutch.
Figure 9:
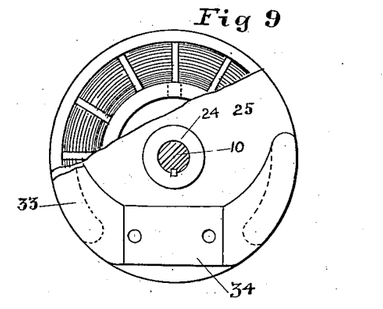
Fig. 9 is a broken transverse section thereof.
Figures 17, 18, 19, 20, 21, 23, 24:
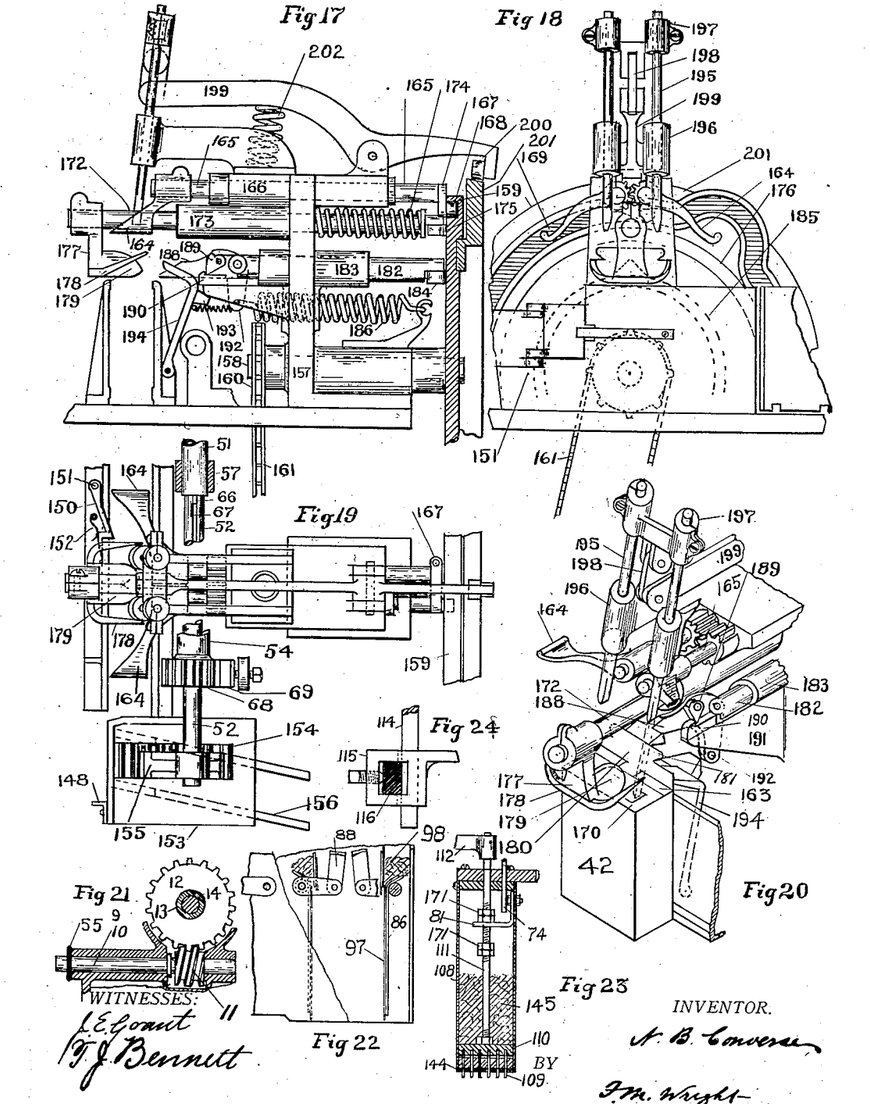
Fig. 17 is an end view of the mechanism for closing the carton.
Fig. 18 is a side view thereof.
Fig. 19 is a plan view.
Fig. 20 is a perspective view.
Fig. 21 is a detail view of the worm gear.
Fig. 23 is a vertical section of the compressor.
Fig. 24 is a cross sectional view of the friction bearing.
Figure 25:
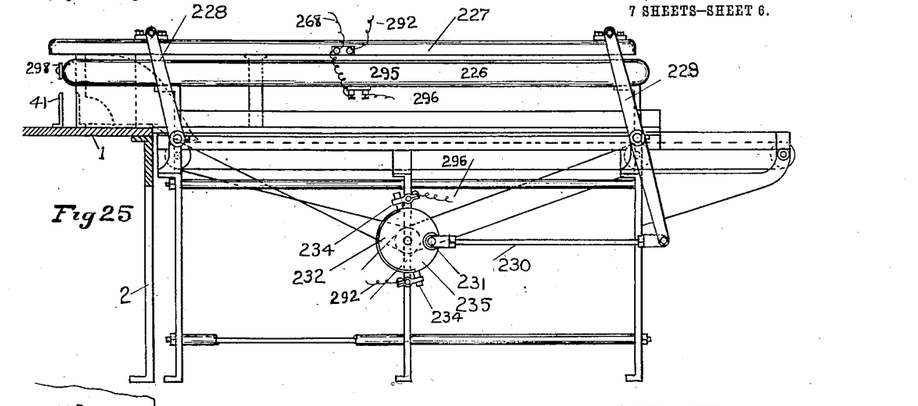
Fig. 25 is a side view of a modified form of feeding mechanism.
Figure 26:
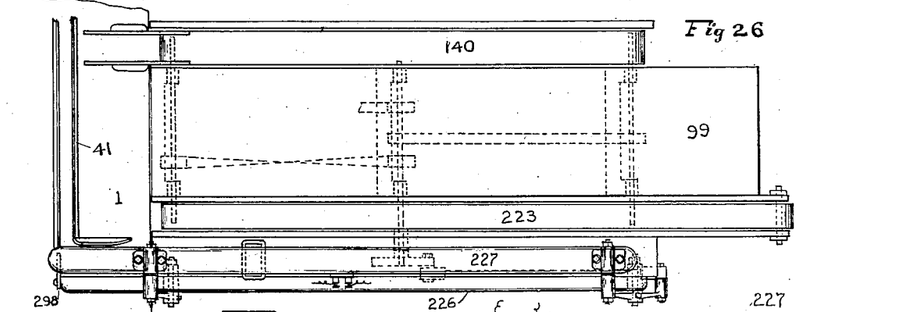
Fig. 26 is a plan view.
Figures 27, 28, 29:
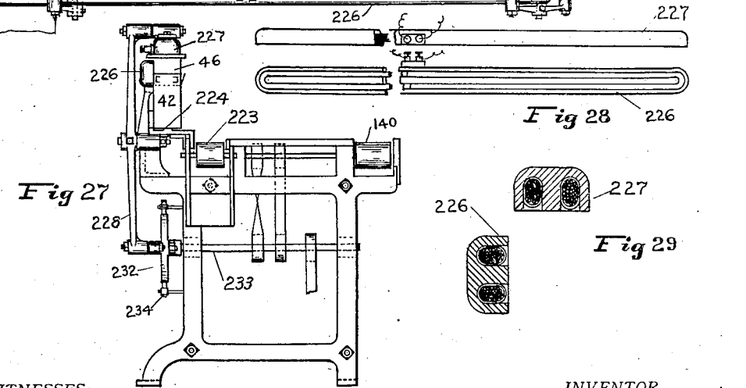
Fig. 27 is an end view.
Fig. 28 is a detail inside view of the electro-magnets.
Fig. 29 is a sectional view thereof.

For obtaining the longitudinal movement of the pushers, there are secured upon the tube 51 collars 59, 60, (see Fig. 3), between which is a block 61 secured to the end of a lever 62 carried by the transverse sleeve 13 loose on the shaft 14, the other arm of said lever carrying a roller 63 which runs in a cam groove 64 in the rear side of the cam wheel 21 upon the transverse sleeve 19. By suitably shaping said cam groove 64, the required longitudinal movement is given to said pushers to advance the cartons the proper distance, and then to withdraw them. And at the proper time in the operation of the machine the rocking motion of said pushers is produced as follows:—The end of the tube 51 next the delivery end of the machine has an internal feather 66, (see Fig. 19) which slides in a feather way 67 in the shaft 52, so that when said latter shaft is rocked, so also are the tube 51 and the pushers secured thereon. Said shaft 52 is rocked by means of a gear wheel 68 thereon which is engaged by a vertically sliding rack 69, (see Figs. 1 and 19) the lower end of which is connected by an adjustable link 70 with the end of a lever 71 mounted on the stationary shaft 14, the other arm of said lever having a roller 72 which moves in a groove 73 in the front side of the cam wheel 21, that is, on the opposite side to the cam groove 64. By giving the proper shape to said groove 73, the shaft 52 and the pushers are rocked at suitable times to, first, raise them from the path of the cartons, and then, after they have been moved back, to drop them down again behind the next succeeding cartons ready for another advance. The cartons thus advanced along the guideway are brought in succession on to a scale platform 75 which rides upon the end of a scale beam 76, the latter being pivoted beneath the table, as shown at 77, and suitably weighted at the rear end, as shown at 78, according to the weight of the material it is desired to pack in each carton, and being also provided with an adjusting weight 79 screwed upon an extension 80 of the scale beam for accurately regulating the weight.

The carton is partly filled with raisins before it is moved on to the scale platform, and for this purpose the supply of raisins from the feeder 82 is divided by a partition 83 into two streams which thus flow down two chutes 84, 85, the first chute 84 supplying the raisins to the empty cartons and partly filling them, and the second chute 85 supplying the raisins to the carton after it has been advanced from the position in which it was partly filled from the other chute. Each chute is controlled by a pair of gates 86, operated by spring-controlled arms 87, connected by links 88 with a bar 89 connected to the core 90 of a solenoid 91. When said solenoid is energized, the core is retracted, and the gates of both chutes are closed, shutting off the supply of raisins. The closing of the gates by the charging of the solenoid is accomplished automatically when the carton under the second chute has received a sufficient proportion of the complete weight of the raisins, that the raisins which have passed the gates before they are closed, and are still falling toward the carton, will, when they reach the carton, make up the complete weight.

It is of the greatest importance for the commercial success of a machine of this character that the cartons when filled should be of a weight as uniform as possible. To sell cartons materially under weight is not practicable, and in a pound carton of seeded raisins an overweight of only half an ounce would amount to a large loss at the end of a day's run of one of these machines.

It is comparatively easy to close the gates precisely at the time when a given weight of raisins has entered the carton, but this will not be effective in obtaining cartons of uniform weight, if the amount of raisins which have passed the closure but have not entered the carton varies at different times. It is not practicable to shut off the supply so that absolutely no more raisins will enter the carton from the instant the flow has been shut off, and therefore the only mechanical way to obtain cartons of uniform weight is to provide means whereby the residual raisins, which have passed the gates before the latter are closed by reason of the carton having been filled to a given weight, but yet have not reached the carton, should have as nearly as possible a uniform weight. This is obtained by providing a uniform flow of the raisins to the cartons, and this, again, is accomplished, first, by starting the raisins in a uniformly flowing stream before processing them, and then by providing conveyers of such a character as to maintain the raisins during all stages of their treatment thereafter in the same uniform flow at which they started, so that said raisins are delivered to the chutes in a uniformly flowing stream. When this is done, it can be absolutely depended upon that the quantity of raisins falling to the carton from the closure after it is closed will be uniform.

The coil of wire around the solenoid core is at the proper time in the operation of the machine included in the same circuit as that which energized the electro-magnet 7 of the clutch, as will more fully appear in the description of electrical connections of the apparatus, so that when the electro-magnetic clutch is actuated and the machine is running, the gates are normally open. But the circuit through the solenoid wire passes through a contact 94 secured upon the weighted arm of the scale beam and a contact 95 supported upon the under side of the table, so that when the scale platform is depressed, said contacts are closed, and the solenoid is energized, thus closing the gates and preventing any more raisins passing therethrough to the carton. But, as soon as the scale platform rises, owing to the substitution of a partly filled carton for a full one, said contacts 94, 95, are separated, the solenoid is deënergized, and the gates open, said opening being accelerated by the action of the spring 96. This immediately allows the raisins or other material to drop from between the gates through the funnel into the cartons, and they will continue to so drop until the leading carton has received such a weight thereof that the scale platform again descends, again closing the contacts, again energizing the solenoid, and closing the gates, when the carton will be filled and will be ready for advancing to permit another to take its place.

In order to prevent raisins or other fruit sticking to the gates and thus accumulating in the spout, the gates have facings 97 of muslin, felt, or other absorbent material, which absorbs the moisture from the fruit and thus remains moist, and prevents the fruit sticking thereto. In addition, moisture may be provided from any extraneous source if desired. Thus on the outside of the spout may be formed a pocket 98 which at intervals of an hour or so is supplied with water, the water passing to the gate by capillarity through a string or cloth or the like extending from the pocket to the gate. The carton, now having been filled to the proper weight, is passed, with its funnel, off from the weighing platform and on to bridge 44, and the next operation is that of packing the fruit in the carton and removing the funnel therefrom. The carton does not, however, immediately pass from the scale platform to the point where this packing takes place, but to an intermediate station, and on a second advance passes from said intermediate station to the point where it is packed.

The carton is advanced on to the top of an elevator 100 carried by a stem 101 sliding vertically in a bearing 102 and connected at its lower end by a link 103 with a lever 104 rocking on a shaft 105 and operated by a roller 106 which rides in a cam groove 107 of the cam wheel 22 upon the sleeve 19. At the proper time in the operation of the machine, said elevator is raised, carrying with it the carton, and bringing the raisins therein into contact with the lower end of a compressor 108. Said compressor is apertured at its lower end, and through said apertures extend pins 109 secured to a head 110 carried by a stem 111 slidably mounted in the compressor, and having an arm 112 on the end of which is pivotally attached a link 113 connected to a rod 114 which slides vertically in a friction bearing 115 on the end of a bracket 116 secured upon the stem 101 of the elevator. When the elevator rises to lift the carton and funnel for the purpose of compressing the raisins in the carton and extracting the funnel, the friction bearing 115, engaging the vertically sliding rod 114, raises the same, and thus raises the pins 109 and withdraws them into the compressor until the lower of two nuts 99 on the stem 111 strikes a bracket 81 in the compressor and arrests said pins. The other nut 99 arrests them in the downward movement. Thus the lower end of the compressor is brought into contact with the upper surface of the raisins in the carton at the time when the pins are retracted.

The funnel 46 is raised out of the carton by means of an extractor 118 secured on a stem 119 connected by a link 120 with a lever 121 controlled by a roller 122 which rides in a cam groove 123 on the cam wheel 22 on the side opposite to the cam groove 107. Said extractor has an angular head with two sides only, each having an upper and a lower lip forming a groove 125 in which is received the corresponding bead 126 of the upper edge of the funnel. As the carton is advanced the extractor is in a position to receive in said groove the beads or flanges on the front and at one of the sides of the funnel; and when the carton has been thus advanced and the extractor and elevator are raised, the engagement of the lips of the extractor with the bead of the funnel is sufficient, together with the pressure of the side of the channel 41 against the other side of the carton, to lift the funnel.

The funnel and carton rise together until the lower end of the compressor enters the mouth of the funnel in the upward movement of the latter, so as to maintain the funnel in the same upward direction and prevent the compressor striking the top of it. When the compressor has entered the funnel and has come into contact with the raisins, the funnel rises more rapidly than the carton, this being effected by the relative contours of the cam grooves 107, 123, and this difference in velocity is continued until the funnel is extracted from the carton, in which the raisins are now being compressed by the compressor. The elevator, under the carton, completes its upward motion considerably before the funnel extractor has completed its upward movement.

Figures 10, 11, 12, 13, 14, 15, 16:
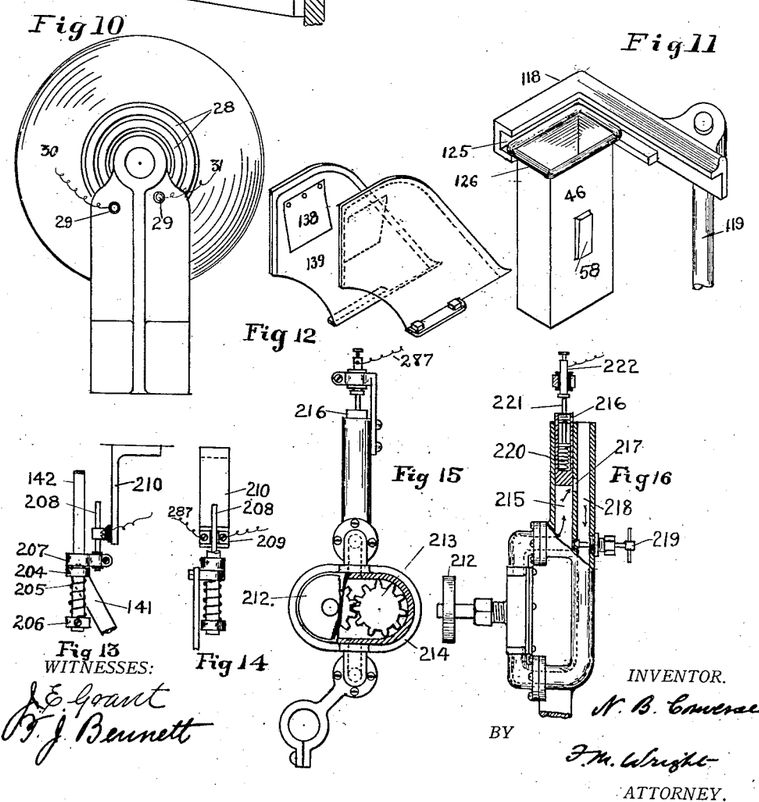
Fig. 10 is an end view.
Fig. 11 is a perspective view of the extractor.
Fig. 12 is a perspective view of the discharge passage for the funnels.
Figs. 13 and 14 are side views, at right angles to each other, of the funnel control cut-out.
Figs. 15 and 16 are similar views of the pump cut-out.

The raisins having been compressed in the carton, it now remains to completely separate the funnel therefrom. For this purpose the elevator descends, so that the upwardly extending flaps of the carton can clear the bottom of the compressor. Then the compressor is given a lateral motion, it being carried by a slide 128 sliding in a guideway 129 secured to the side beams 130 of the machine, said slide 128 being connected by a wrist pin 131 and link 132 with the top of an arm 133 on a rock shaft 134 in a bearing 135, said shaft carrying an arm 136, which, at its lower end, carries a pair of rollers 137 which roll on opposite sides of the periphery of the cam disk 23 mounted on the sleeve 19. At the same time that the compressor is moving to one side, carrying with it the funnel, the extractor is descending, but one of its grooves is extended (see Fig. 11) to engage the bead on the front side of the funnel and hold it up, the funnel being slidably supported by said extractor, until the compressor has moved it laterally into a guideway formed by spring walls 138 upon the inner sides of a casting 139 (see Fig. 12), and the upper lip of the extractor presses it down into said guideway at the same time that the compressor moves it laterally therein. In this position it remains until a succeeding funnel is moved in the same manner into contact therewith, pushing it onward in the guideway, and thus the funnels are pushed on to a conveyer belt 140 by which they are conveyed to a suitable position to be taken up by an operator and wrapped in a piece of lining paper and placed in another empty carton, said paper and cartons being placed in piles on a table 99, before which the operators sit and fold or form the cartons.

When the elevator moves downward, the pins 109 are also moved downward, by the engagement of the rod 114 with the friction bearing 115, and thus positively force off from the compressor any raisins which may have adhered thereto.

Upon the other end of the lever 121 which operates the extractor is secured a link 141, which connects indirectly, in the manner to be presently explained, with a vertically sliding bar 142 carrying a depressor 143 extending over the channel or guideway for the cartons, which depressor is thus periodically moved downward upon the top of the funnel in each carton as it passes, and insures that the funnel has been inserted in the carton to the proper depth, so that it will pass under the feeding spouts.

In order to prevent the raisins or other fruit sticking to the bottom of the compressor, the latter is provided on its pressure surface with a pad 144 of absorbent material, which is maintained moist by the moisture of the fruit and in its moist condition prevents the sticking of the fruit thereto; but in addition there may be provided, as shown at 145, absorbent material within the compressor, said absorbent material being maintained moist by a pipe 74 leading from any suitable supply of water. The funnels are kept free from sticky residue of the fruit by the fact that their outer sides are constantly wiped against the oiled paper when they are withdrawn from the cartons, and their inner sides are wiped by the plunger and the pad thereon. The sides of the funnel are thus also maintained slightly damp by said pad.

After the carton has left the location in which the raisins or other material are pressed down into place; then, having been pushed forward one stage by the pushers, in the manner already described, it remains at rest during the next cycle of operation of the machine, and is then pushed another stage forward to the position where the top of the carton is closed by passing the tongues of one flap into the slits of the opposite flap. But to prevent the cartons advancing too far, since they are now free from the funnels and move loosely in the guideway, there is provided a stop 148 secured on the side of a discharger 153, and arresting the foremost carton. It is not, however, at first stopped at the exact position whence it is to be discharged laterally, but slightly past the same, and is then justified to the exact position by special mechanism for this purpose. This mechanism operates to push the line of cartons back, until one of them is stopped by a latching stop 150 which is pivoted at one side of the path of the carton on a vertical pivot 151 and is moved inward into the path of the carton by a spring 152.

The carton in its forward movement presses the latching stop outward, which, when the carton has passed the same, immediately thereafter springs inward. The pusher opposite this latching stop is made of extra thickness, as seen at 57' in Fig. 3, and the backward motion of the pushers after their forward motion must be sufficient to enable this pusher 57' to clear said latching stop. A carton moved back against said latch stop will be in the exact position for closing the top, and to so move it back, the same mechanism is utilized which discharges a carton already closed. This mechanism comprises a discharger 153 sliding obliquely, that is, both laterally and rearwardly, and having a rack 154 operated by a segment gear 155 upon the longitudinal shaft 52. This segment gear 155 is so arranged on said shaft that, when the pushers are descending behind the cartons, the rack 154 is moved backward or away from the path of the cartons. There is then a period of rest for this rack 154 while the pushers 57 are moving forward and transferring the cartons from one station to the next. This operation brings a carton into the path of the discharger 153, and then, on the next forward movement of the discharger due to the motion of the segment gear, said carton is discharged to one side, out of the path of the remaining cartons, and the discharger, being given a rearward movement, as well as a lateral movement, transmits this rearward movement to the carton succeeding that which is being discharged, and this again transmits a rearward movement to the carton which is underneath the mechanism for closing the top, bringing the latter carton up against the spring-actuated stop 150, and placing it in the exact position for the operation of the closing mechanism. This closing mechanism is as follows:—Upon one side of the guideway is secured a frame 157, in which is a horizontal transverse shaft 158, carrying a cam disk 159, having thereon various cams for operating the several members of the closing mechanism. This cam disk is rotated by means of a sprocket wheel 160 on its shaft driven by a sprocket chain 161 from a sprocket wheel 162 on the sleeve 13. The first part of the operation of closing the top is to turn inward the two small plain flaps 163 of the top of the carton. These small flaps, together with the projecting ends of the lining paper, are moved inward by means of two turner pieces 164 secured upon the ends of shafts 165 in bearings 166, said shafts carrying segment gears meshing with each other, causing the turner pieces to move in unison, one of the shafts carrying a crank arm 167, on the end of which is a roller 168, which rides in a cam groove 169 in the face of the cam disk 159. This cam is so shaped that at the proper time the two turner pieces first move downward and inward to turn the flaps 163 over upon the top of the carton, and then move back to their original position. The next step in the operation is the turning over of the slitted flap 170 which receives the tongues of the opposite flap. For this purpose there is provided a rod 172 sliding in a bearing 173 and retracted by a compression spring 174, and carrying a roller 175 which runs upon the face of a crown cam 176 on the cam disk 159, such that, at a suitable time in the revolution of the cam disk, said rod is caused to move inward, carrying with it the former 177. Said former comprises a pair of outer fingers 178 and a central shaper 179, the ends of said fingers extending in advance of the shaper, so that, as the former is moved inward, the ends of said fingers first engage the edge of the flap 170, which is, of course, at that time standing vertical, and thus bend said flap inward, first at its edge, giving it the proper form, and the central shaper then also engages the central part of the flap and pushes it downward and inward, carrying with it any portion of the lining paper that may be extended in front of the flap. Ordinarily, however, the side flaps, the folding of which has already been described, carry down with them all the lining paper. The fourth flap 180, having the tongues 181 to engage the slits in the last described flap, is then bent inward over said last flap. For this purpose there is provided a rod 182 sliding in a bearing 183, and having a roller 184 engaged by a crown cam 185 upon the face of the cam disk 159, and normally drawn to said cam disk by means of a spring 186, the inclines of the cam being such that, at the proper time, the roller 184 is moved outward from said disk, and the rod 182 is advanced across the channel for the cartons. The advancing end of said rod carries a presser piece 188 pivoted thereon, said presser piece itself carrying a pivoted dog 189, the nose of which engages a stop 190 secured upon a bracket 191 extending from the frame, the effect being to raise the pivot of said dog and thereby also raise the front end of the presser piece so that its nose engages the flap 180 near the top. Also an arm 192 depending from said presser piece moves forward and engages a boss 193 upon the rear side of a forked bender piece 194, the ends of which fork engage the edges of the flap 180, while the end of the presser piece impinges upon the flap near its edge, whereby said flap is bent down and inward across the scored line of the carton blank without buckling. By this means the flap 180 having the ears 181 is laid down close to the shaper 179, which itself lies over the slitted flap 170.

By reason of the flap 180 lying on the top of the shaper 179, and thus being bent into a convex form, the ears 181 are withdrawn inward, so that they are within the space between the slits of the other flap 170. They then have to be inserted in said slits. For this purpose there is provided a pair of prods 195, which slide in bearings 196, and are connected near the top to a cross-head 197 secured by a link 198 to the end of a lever 199, carrying on the end of its other arm a roller 200, which rolls upon a peripheral cam 201 secured upon the cam disk 159. The front end of said lever is raised by a compressed spring 202, and at the proper time in the operation of the machine said cam 201 actuates said roller 200 to depress the prods 195, causing them to impinge upon the ears of the flap and forcing the ears down upon the slitted flap 170 into the proper place to enter the slits therein. At the same time the former 177 is being withdrawn slightly, and shortly after the withdrawal the prods 195 are slightly raised to relieve the pressure upon the flap and thus allow the presser piece in descending to cause the ears to enter the slits, this descent being caused by the withdrawal of the shaper. It was the presence of the shaper 179 underneath the flap 180 that prevented the descent of the latter and of the presser piece 188, and as the shaper 179 withdraws, the presser piece descends, causing the ears of the flap 180 to enter the slits, and it is to permit this that the prods are slightly raised. After being raised sufficiently to relieve the pressure on the ears, the prods remain slightly raised above the ears to insure them entering into the slits, and when the ears have entered the slits, the prods are completely raised. The presser is now withdrawn to permit of another carton entering. The carton thus closed is then advanced and discharged in the manner already described.

In order to avoid a flood of raisins on the machine and floor, should the operators fail to keep the machine supplied with cartons and funnels therein, the link 141 is not connected directly with the bar 142, but indirectly through the interposition of a collar 204 loose on the bar 142, pivotally attached to the link 141, and resting upon the coiled spring 205 around the bar 142, the spring resting upon the nut 206. To the bar 142 is attached a collar 207 which carries a metallic bar 208 which slides between two contact plates 209 secured on a bracket 210, said plates being in the electric circuit which controls the feed of the raisins, as will be presently described. If the depressor 143, when descending, meets a funnel and presses it into the carton, its further downward movement being arrested by the funnel reaching the bottom of the carton, the bar 208 remains in contact with the plates 209, and the above circuit remains closed. But if no funnel is there, the depressor descends so that the bar 208 escapes from between the plates 209, and the circuit is broken, and the feed of the raisins is stopped. The same circuit is also broken should the machine stop running from any cause. To accomplish this object, with the periphery of the wheel 22 contacts a roller 212 which is thereby maintained in revolution, so long as the machine is running, imparting revolution to two co-engaging toothed wheels 213 in a casing 214, supported on the shaft 105, which wheels thus pump oil or other liquid up a passage 215, this being a well known form of pump, thereby maintaining a piston 216 in an elevated position, the oil escaping by an aperture 217 and return channel 218. A controlling valve 219 is also provided. A spring 220 is interposed between the piston 216 and a rod 221, which is thus maintained in contact with a metallic bar 222, so long as the machine is running, the rod dropping from the bar, and thus breaking the circuit, when the machine stops.

In Figs. 25 to 29 inclusive is illustrated a modification of the means for feeding the cartons, with the funnels therein, to the machine. This feeding mechanism is especially adapted to prevent any carton being jammed between the wall of the guideway of the machine and the entrance thereto. At the same time, it permits the operators to work ahead of the machine so that a considerable number of cartons prepared for the machine may remain in readiness therefor and be taken up automatically by the machine. In this modification, 223 is a conveyer belt, upon which the operator buttoning the first end, or bottom of the carton, places the same. Said belt then carries the cartons to the operators, who are wrapping in lining paper the funnels, conveyed to them by the belt 140, which operators take the cartons, place inside of them wrapped funnels, and then place them in a slideway 224. If the slideway is full, the operators wait until there is room for more cartons with funnels in them.

Above and by the side of the guideway are supported two long electro-magnets 227, 226, of which the magnet 226 is fixed, while the magnet 227, close to the tops of the funnels on the slideway, is carried on swinging arms 228, 229, the latter being extended to form a lever and connected by a link 230 to a wrist pin 231 on a disk 232 on a shaft 233, driven from any suitable source of power. By this means the electro-magnet 227 is given a reciprocating motion. The coils of these electro-magnets are connected with diametrically opposite brushes 234, which wipe the periphery of the disk 232, one half 235 of which is insulated, so that the magnets are energized and deënergized in turn and alternately, the magnet 227 being energized in its forward movement when the magnet 226 is deënergized, and the latter being energized on the rearward movement of the magnet 227, then deënergized. The result is that on the forward movement of the magnet 227 the cartons and funnels are moved forward with it, and then held in that position by the magnet 226 while the magnet 227 returns. By this means the cartons are moved to the guideway 41, the foremost carton being arrested by a stop 298.

The packing mechanism heretofore described, when used for packing seeded raisins, can be operated practically only in a well regulated combination with a line of machinery for processing and seeding raisins. This line of machinery is illustrated diagrammatically in Fig. 30, in which 240 indicates a sweating machine for softening the raisins. These are fed into a hopper 241 at one end of the sweating machine, from which they escape below an adjustable gate 242, and are conveyed forward by two series of alternating narrow vertical blades, the blades of one or both of said series moving forward when above those of the other series and rearward when below, as more fully described in my application Serial Number 274,272. These movements are produced by a belt 243 from a pulley on a shaft 244. The conveyer blades are contained in a substantially closed chamber, heated by steam coils 246, live steam being also introduced into the chamber by a pipe 247. From the sweating machine the raisins are delivered by a spout 248 to a feeder 249 of like character with the conveyer in the sweater, said feeder being operated by a belt 250 from a pulley 251 on the shaft 244. The feeder feeds the raisins to the seeding machine 252, which may be of any well known type. From said seeding machine the raisins are delivered by a chute 253 to a hopper 254, and by a feeder 82, also of the same character as before, and operated by a belt 255 from a pulley 256 on the shaft 244, they are conveyed to the spouts 84, 85, of the packing machine.

Figure 30:
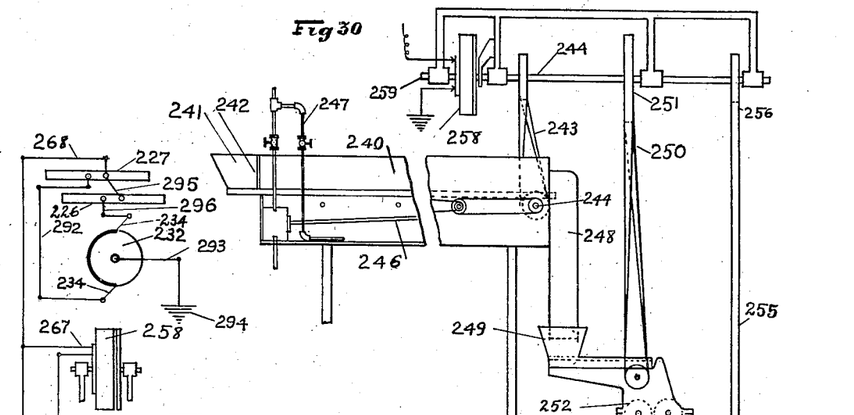
Fig. 30 is a diagrammatic view of the entire apparatus.

The shaft 244 is intermittently driven in like manner as the shaft 10 of the packing machine, that is, by an electro-magnetic clutch 258 similar to that formed by the pulley 7 and disk 25, being thus operated from a constantly revolving shaft 259.

Figure 31:
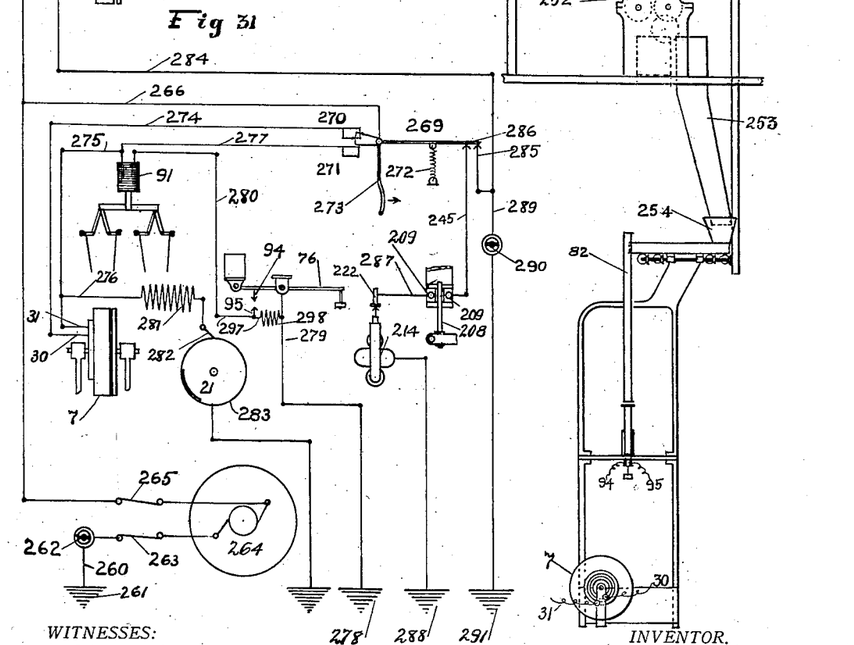
Fig. 31 is a similar view of the electrical connections.

The electric control of the apparatus is illustrated diagrammatically in Fig. 31, in which it is seen that a wire 260 leads from the ground at 261 through a switch 262, fuses 263, generator 264, fuses 265, to three branches 266, 267, 268, each leading independently to ground. The branch 266 leads to a knee lever 269 adapted to connect electrically with either of two contacts 270, 271, and actuated by a spring 272, so that it is normally in electrical connection with the contact 270, but when the operator presses the knee against an arm 273 of said lever, it is thereby moved into electrical connection with the contact 271. The contact 270 is connected with a wire leading to the wire 30 of the electro-magnetic pulley 7, the circuit continuing from the other wire 31 by two subsidiary branches 275, 276, each leading to the ground. The subsidiary branch 275 leads through the coil of the solenoid 91, and then by a wire 280 to the contact 95, which by the descent of the scale platform in weighing the raisins is connected with the other contact 94 connected with the ground at 278 through the lever 76 and a wire 279. The contacts 94, 95, are, however, short-circuited by a wire 297 through a resistance 298 sufficient to deënergize the solenoid 91 when the current passes through the resistance, the object being to prevent the formation of an arc at said contacts when breaking the circuit. The other contact 271 is connected by a wire 277 with the wire 275 leading to the solenoid.

The subsidiary branch 276 leads through a resistance coil 281 to a brush 282 which wipes the periphery of the cam wheel 21, part of which, 283, is insulated, the wheel 21 itself being connected to the ground by the frame of the machine, so that the branch 276 is grounded when the brush is on the metallic portion of the periphery, and thus at that time the circuit is maintained closed through the electro-magnetic clutch.

The second main branch 267 passes through the electro-magnetic clutch 258, then by a wire 284 to a point 285, contacting with a contact plate 286 on the lever 269, thence by a wire 245 to the funnel control contact plate 209, through the contact bar 208, other contact plate 209, wire 287, to the contact 222 of the pump 214, and thence to ground at 288. A subsidiary branch 289 leads through a switch 290 to ground at 291.

The third main branch 268 leads to the electro-magnet 227 and from there by wire 292 to the brush 234 against the periphery of the disk 232, and through said disk by wire 293 to ground at 294; or the circuit passes from the wire 268 by wire 295 to the other electro-magnet 226, by a wire 296 and brush 234 to the disk 232, and thence by wire 293 to the ground as before, these paths through the disk being taken alternately by the current according as one or the other of the brushes 234 is in contact with the metallic portion of the disk.

The functions of the electrical parts of the apparatus are therefore as follows:— The operator closes the switch 262, whereupon the current flows to ground through one or the other of the electro-magnets 226, 227, which, then, being alternately energized, feed the cartons to the machine. The operator also closes the switch 290, which starts the sweating machine and conveyers at a suitable time, so that the seeded raisins do not arrive at the weighing machine before the cartons. After the machine is in full operation and a carton with a funnel therein passes to the weighing machine, the operator opens the switch 290, so as to permit the apparatus to be controlled automatically. Thereafter the movement of the gates discharging into the chutes is controlled by the circuit 277, 278, through the scales. The advance of the cartons is controlled by the circuit 266. If the brush 282 reaches the insulated portion 283 of the cam wheel 21, the circuit through the electromagnetic pulley 7 is broken, and the machine stops. While it is at rest the raisins or other material are dropping into the carton, and when the proper weight is obtained therein, the carton descends, the circuit is reëstablished through the scale beam contacts 94, 95, and the machine is re-started. This circuit through the contacts 94, 95, is by the weight of the carton which is being pushed off the scale platform maintained long enough to clear the brush from the insulation, and when said advance of the carton frees it from the scale platform, the scale rises, breaking the circuit through the solenoid, and then the circuit is reëstablished through the metallic portion of the wheel 21 for the remainder of its revolution. By carefully adjusting the feed, it may be arranged that the carton is full at or just after the time when the brush 282 arrives at the insulated portion 283 of the wheel, so that there is little or no stoppage of the machine.

While I have in the specification and claims referred to the package which is being filled as a carton, it is to be understood that my invention is applicable to machines for filling any kind of packages of any material and shape. Also that my invention is not limited to the precise construction herein disclosed, but that modifications and changes may be made therein without departing from the spirit and scope of my invention.

I claim:—

1. In an apparatus of the character described, the combination of a weighing device having a scale platform, a spout for discharging material above said platform, and a gate for said spout having facings of absorbent material, substantially as described.

2. In an apparatus of the character described, the combination of a weighing device having a scale platform, a spout for discharging material above said platform, and a gate for said spout having facings of absorbent material, and means for supplying said absorbent material with moisture, substantially as described.

3. In an apparatus of the character described, the combination, with means for filling a carton, of means for compressing the material therein, an extractor for extracting a funnel from the carton, and means for moving vertically said extractor relatively to said compressing means, substantially as described.

4. In an apparatus of the character described, the combination, with means for filling a carton, of a support for the carton, means for compressing the material therein, an extractor for extracting a funnel from the carton, and means for moving vertically said extractor relatively to said support, substantially as described.

5. In an apparatus of the character described, the combination of a support for the carton, an extractor for a funnel in said carton, a compressor for the material in the carton, means for producing a relative approach of said support and compressor, means for simultaneously separating the funnel and the compressor from the carton, and means for laterally moving the compressor and funnel from the carton and for separating the funnel from the compressor, substantially as described.

6. In an apparatus of the character described, the combination of a support for the carton, an extractor for a funnel in said carton, a compressor for the material in the carton, means for producing a relative approach of said support and compressor, means for simultaneously separating the funnel and the compressor from the carton, and means for laterally moving the compressor and funnel from the carton and for separating the funnel from the compressor, substantially as described.

7. In an apparatus of the character described, the combination of an elevator for the carton, an extractor for a funnel in said carton, a compressor for the material in the carton, means for raising the elevator to the compressor, means for lowering the carton from the compressor and funnel, means for moving the compressor and funnel laterally, and means for separating the funnel from the compressor, substantially as described.

8. In an apparatus of the character described, the combination of a support for the cartons, a compressor for compressing the material therein, an extractor for the funnel in the carton, and means for moving the compressor laterally, said extractor having an angular head with two sides only, to engage two sides of the funnel, substantially as described.

9. In an apparatus of the character described, the combination of a support for the carton, a compressor for compressing the material therein, an extractor for the funnel in the carton, and means for moving the compressor laterally, said extractor having an angular head with two sides only, to engage two sides of the funnel, one of said sides being extended to permit the funnel to slidably engage the same, substantially as described.

10. In an apparatus of the character described, the combination of a support for the carton, a compressor for compressing the material therein, an extractor for the funnel in the carton, and means for moving the compressor laterally, said extractor having an angular head with two sides only, each of them grooved to engage the beads of the two sides of the funnel, substantially as described.

11. In an apparatus of the character described, the combination of a support for the carton, a compressor for compressing the material therein, an extractor for the funnel in the carton, means for moving the compressor laterally, and a guideway into which the funnel is laterally moved, substantially as described.

12. In an apparatus of the character described, the combination of a plunger, a funnel extractor, provided with means for engaging a funnel, means for depressing the plunger and means for removing from the extractor a funnel engaged thereby, substantially as described.

13. In an apparatus of the character described, the combination of a guideway for the cartons, a chute to receive funnels, when removed from the cartons, an extractor for removing the funnel from the carton, and means for transferring the funnel from the extractor to the chute, substantially as described.

14. In an apparatus of the character described, the combination of a support for the carton, a compressor for compressing the material therein, an extractor for the funnel in the carton, means for moving the compressor laterally, and a guideway with spring walls into which the funnel is laterally moved, substantially as described.

15. An organized apparatus of the character described comprising a sweating machine for softening the raisins, a raisin seeder, a conveyer from said sweating machine to said seeder, a packing machine, a feeder from said seeder to said packing machine, and means for arresting the movement of the raisins through all of said machines in unison, substantially as described.

16. In an apparatus of the character described, the combination of a source of electricity, a line running therefrom to ground, a switch therein, packing machinery, an electro-magnetic clutch controlling the main shaft of said machinery, a gate for the supply of the material to said machinery, an electro-magnetic device controlling said gate, means for advancing the packages, a wheel for transmitting movement to said advancing means, said wheel being in electric connection with the ground, a line from the part of the circuit between the clutch and the device to said wheel, a contact at the end of said line contacting with said wheel, said wheel having an insulated portion over which the contact travels in that part of the revolution of the wheel, weighing scales for each package, a line from the clutch to the device, a contact closed by the descent of the scale pan and leading to the other pole of the device, and a second line leading from said contact to the ground, substantially as described.

17. In an apparatus of the character described, the combination of mechanical devices for filling packages with material, a shaft for transmitting motion to said devices, a gate for the supply of the material to said devices, weighing scales for each package, an electro-magnetic controller for the gate, a contact in the circuit of the controller closed by the descent of the scale pan, an electro-magnetic clutch for the main shaft for the filling devices, and a wheel in the electric circuit of said clutch, said wheel revolving in unison with said shaft, and said wheel having an insulated portion which breaks the circuit through the wheel during part of the revolution thereof, substantially as described.

18. In an apparatus of the character described, the combination of mechanical devices for packing a carton, an electro-magnetic controller for the power transmitted to said devices, two branches therefrom to ground, a circuit changer in each branch, one such changer being actuated at a predetermined point in the cycle of operations to break the circuit therethrough, electro-magnetic means in the other branch for controlling the supply of material, the other circuit changer closing the circuit through said branch upon the filling of the carton, and the closing of said circuit actuating the controlling means to cut off the supply of material, substantially as described.

19. In an apparatus of the character described, the combination with devices for packing a carton, of a controller for the power actuating said devices, and two independent means for operating said controller, one of said means being brought into operation at a predetermined point in the cycle of movement of the packing devices and the other means being independently brought into operation upon the removal of the filled package, substantially as described.

20. In an apparatus of the character described, the combination with devices for packing a carton, of a controller for the power actuating said devices, and two independent means for operating said controller, one of said means being brought into operation at a predetermined point in the cycle of movement of the packing devices and the other means being independently brought into operation upon the removal of the filled package, and mechanism whereby said latter means operates to cut off the supply of material when the package is filled.

21. In an apparatus of the character described, in combination with means for feeding the material to be packed in cartons, and means for advancing the cartons to the point at which said material is fed, an electric circuit controlling said feed, a depresser for depressing a funnel in a carton, and means, moving with said depresser, for maintaining closed a break in said circuit, said means being inoperative when the depresser makes its complete movement without depressing a funnel, substantially as described.

22. In an apparatus of the character described, in combination with means for feeding the material to be packed in cartons, and means for advancing the cartons to the point at which said material is fed, an electric circuit controlling said feed, a depresser for depressing a funnel in a carton, a contact bar having a resilient connection with said depresser, and a pair of contact plates in the electric circuit, between which said bar moves, substantially as described.

23. In an apparatus of the character described, in combination with means for feeding the material to be packed in cartons, and means for advancing the cartons to the point at which said material is fed, an electric circuit controlling said feed, a pump, operated in unison with the means for advancing the cartons, and means, operated by the pump, for maintaining closed a break in said circuit, substantially as described.

24. In an apparatus of the character described, the combination of a way, electro-magnets adjacent to said way, means for reciprocating one of said magnets, and means for alternately energizing said magnets, substantially as described.

25. In an apparatus of the character described, the combination of a way, an electro-magnet adjacent thereto, means for reciprocating said magnet in a direction parallel with the way, and means for energizing said magnet during its movement in one direction only, substantially as described.

26. In an apparatus of the character described, the combination of a way, an electro-magnet adjacent thereto, means for reciprocating said magnet in a direction parallel with the way, means for energizing said magnet during its movement in one direction only, to advance cartons on said way, and means for arresting the cartons on the return movement of the magnet, substantially as described.

27. In an apparatus of the character described, the combination of a packing machine, an electro-magnetic controlling device therefor, a sweating machine, a seeding machine means for feeding the raisins from the sweating machine to the seeding machine, an electro-magnetic controlling device therefor, an electric circuit, a switch, and two contacts with which said switch can connect said circuit alternately, a wire connecting one of said contacts with the first of said devices, means for feeding the raisins from the seeding machine to the packing machine, electro-magnetic means for controlling said feed, a wire leading from said first device to said electro-magnetic means, a connection therefrom to the circuit, having a break, and means controlled by the weight of the material fed for closing said break, substantially as described.

28. In an apparatus of the character described, the combination of a packing machine, an electro-magnetic controlling device therefor, a sweating machine, a seeding machine, means for feeding the raisins from the sweating machine to the seeding machine, an electro-magnetic controlling device therefor, an electric circuit, a switch, and two contacts with which said switch can connect said circuit alternately, a wire connecting one of said contacts with the first of said devices, means for feeding the raisins from the seeding machine to the packing machine, electro-magnetic means for controlling said feed, a wire leading from said first device to said electro-magnetic means, a connection therefrom to the circuit having a break, means controlled by the weight of the material for closing said break, and a connection from the other contact to said electro-magnetic means, substantially as described.

29. In an apparatus of the character described, the combination of a packing machine, an electro-magnetic controlling device therefor, a sweating machine, a seeding machine, means for feeding the raisins from the sweating machine to the seeding machine, an electro-magnetic controlling device therefor, an electric circuit, a switch, and two contacts with which said switch can connect said circuit alternately, a wire connecting one of said contacts with the first of said devices, means for feeding the raisins from the seeding machine to the packing machine, electro-magnetic means for controlling said feed, a wire leading from said first device to said electro-magnetic means, a connection therefrom to the circuit having a break, means controlled by the weight of the material fed for closing said break, a wheel revolving with the movement of the machine, and having on its periphery an insulated portion, a wire leading from said electro-magnetic means to said periphery, and a connection from said wheel to said circuit, substantially as described.

NEWTON B. CONVERSE.

Witnesses:
F. W. WRIGHT,
J. E. GRANT.